(12) United States Patent
Li et al.

(10) Patent No.: US 8,537,557 B2
(45) Date of Patent: Sep. 17, 2013

(54) MOUNTING APPARATUS FOR EXPANSION CARD

(75) Inventors: Nai-Juan Li, Shenzhen (CN); Zhi-Ping Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 335 days.

(21) Appl. No.: 13/039,346

(22) Filed: Mar. 3, 2011

(65) Prior Publication Data

US 2012/0033387 A1    Feb. 9, 2012

(30) Foreign Application Priority Data

Aug. 5, 2010 (CN) .......................... 2010 1 0246201

(51) Int. Cl.
*H05K 5/00* (2006.01)

(52) U.S. Cl.
USPC ............................ 361/730; 361/756; 361/810

(58) Field of Classification Search
USPC ......... 361/728–730, 732, 752, 796, 800–803, 361/807, 809, 810, 759, 712–714, 756
See application file for complete search history.

(56) References Cited

U.S. PATENT DOCUMENTS

| | | | | |
|---|---|---|---|---|
| 5,982,627 A | * | 11/1999 | Haughton et al. | 361/759 |
| 6,174,189 B1 | * | 1/2001 | Kuo et al. | 439/327 |
| 6,396,690 B1 | * | 5/2002 | Blatti | 361/690 |
| 6,462,959 B1 | * | 10/2002 | Fu et al. | 361/801 |
| 6,788,533 B2 | * | 9/2004 | Chen et al. | 361/679.33 |
| 7,310,241 B2 | * | 12/2007 | Peng et al. | 361/801 |
| 7,545,650 B2 | * | 6/2009 | Sanchez et al. | 361/759 |
| 2003/0016496 A1 | * | 1/2003 | Kim et al. | 361/695 |

* cited by examiner

*Primary Examiner* — Hung S Bui

(74) *Attorney, Agent, or Firm* — Altis Law Group, Inc.

(57) ABSTRACT

A mounting apparatus includes a chassis, an expansion member attached to a first end of the expansion card and a mounting tray. The chassis includes a front plate and a rear plate opposite to the front plate. The expansion member is engaged with the rear plate. The mounting tray includes a first section and a second section connected to the first section. A retaining slot is defined in the first section. An engaging portion is disposed on the second section, and a positioning slot defined in the engaging portion. The positioning slot and the retaining slot are located in a longitudinal line. The first section is engaged with the front plate, and the retaining slot and the positioning slot receive a second end of the expansion card.

18 Claims, 5 Drawing Sheets

MOUNTING APPARATUS FOR EXPANSION CARD

BACKGROUND

1. Technical Field

The present disclosure relates to mounting apparatuses, and particularly to a mounting apparatus for securing expansion cards to an electronic device.

2. Description of Related Art

A computer system usually includes electronic cards, which typically provide additional functions for the computer system and are commonly referred to as expansion cards, such as sound cards, video cards, and graphics cards, for enhancing the capabilities of the computer system. It is labor intensive and time-consuming to replace or upgrade the expansion cards are as they are often attached to the computer system with screws.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
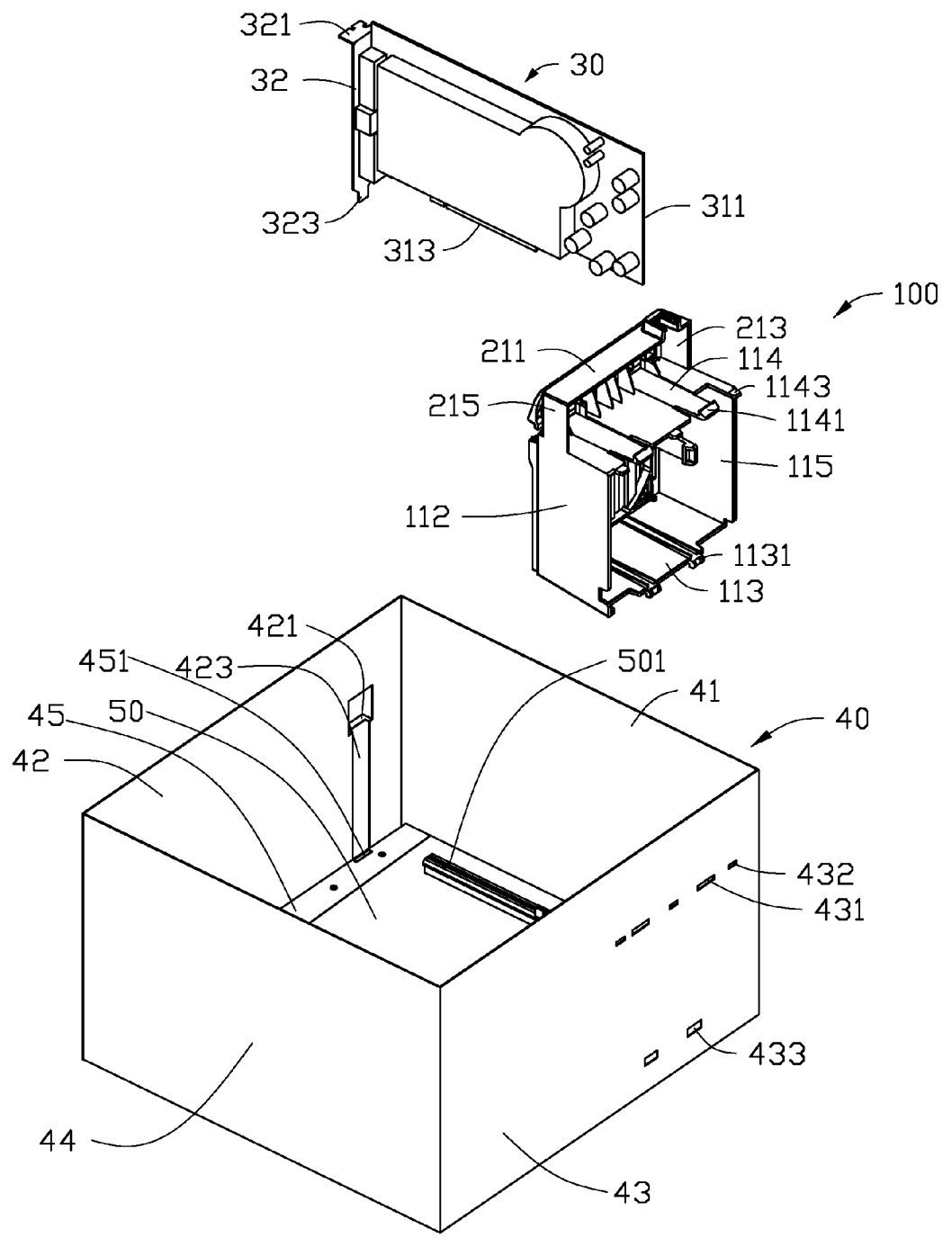
FIG. 1 is an exploded, isometric view of a mounting apparatus in accordance with an embodiment.

Referring to FIG. 1, a mounting apparatus, according to one embodiment, is configured for securing an expansion card 30. The mounting apparatus includes a chassis 40 and a mounting tray 100. The expansion card 30 may be, for example, sound cards, video cards, or other Peripheral Component Interconnect (PCI) Express (PCI-E), or small computer system interface (SCSI), etc.

An inserting portion 313 extends from a long edge of the expansion card 30, and an expansion member 32 is adhered to a first short end of the expansion card 30. A flange 321 is located on a first end of the expansion member 32, and an extending member 323 extends from a second end of the expansion member 32 opposite to the first end.

The chassis 40 includes a bottom plate 45, two side plates 41, 44 connected to opposite edges of the bottom wall 45, a front plate 43 connected to the bottom wall 45, and a rear plate 42 connected to the bottom wall 45. A motherboard 50 is attached to the bottom wall 45, and a PCI extension slot 501 is located on the motherboard 50, for coupling the inserting piece 313 of the expansion card 30. An aperture 451 is defined in bottom wall 45, adjacent to the motherboard 50, for receiving the extending member 323 of the expansion member 32. Three first clipping holes 432, two second clipping holes 431, and two third clipping holes 433 are defined in the front plate 43. Each second clipping holes 431 is located between every two first clipping holes 432. In one embodiment, the three first clipping holes 432 and the second clipping holes 431 are arranged in a first row, and the two third clipping holes 433 are arranged in a second row parallel to the first row. An opening 423 is defined in the rear plate 42, and an edgefold 421 is located above the opening 423. In one embodiment, the opening 423 is adjacent to the aperture 451, and the edgefold 421 is located outside of the chassis 40. In one embodiment, the two side plates 41, 44 are substantially parallel to each other and substantially perpendicular to the front plate 43 and the rear plate 42.

Figure 2:
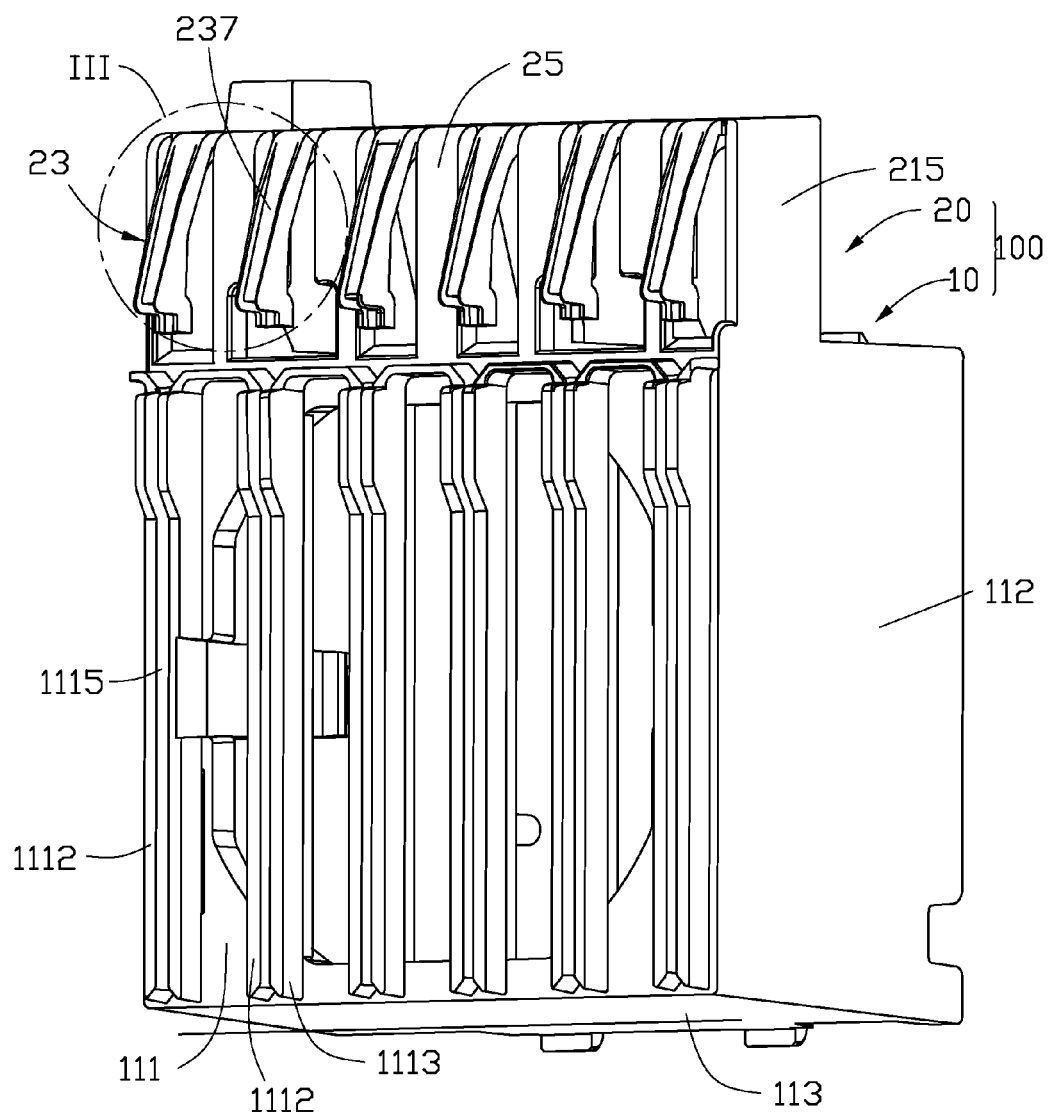
FIG. 2 is an isometric view of a mounting tray in accordance with an embodiment.

Referring to FIG. 2, the mounting tray 100 includes a first section 10 and a second section 20 connected to the first section 10. The first section 10, receives a fan (not shown), includes a base 111, two side panels 112, 115 (see FIG. 1 also) connected to opposite edges of the base 111, a top panel 114 connected to the top edge of the base 111, and a bottom panel 113 connected to a bottom edge of the base 111. A though hole 117 (see FIG. 4) is defined in the base 11, and a plurality of baffles 118 is connected to opposite edges of the through hole 117, for opening or closing the through hole 117. A plurality of first retaining panels 1112 and a plurality of second retaining panels 1113 are disposed on a side of the base 111. Each second retaining panel 1113 is adjacent to each first retaining panel 1112. A retaining slot 1115 is defined between each first retaining panel 1112 and each second retaining panel 1113 adjacent to the first retaining panel 1112, for receiving a second short end 311 (shown in FIG. 1) of the expansion card 30. Three first clasping portions 1143, corresponding to the first clipping hole 432, extend from the top panel 114, and two second clasping portion 1141, corresponding to the second clipping hole 431, extend from the top panel 114. Two third clasping portions 1131 extend from the bottom panel 113.

The second section 20 includes a top wall 211 and two side walls 213, 215 connected to opposite edges of the top wall 211. The two side walls 213, 215 are respectively connected to the two side panels 112 of the first section 10. A plurality of separating panels 25 is located on a first side of the second section 20. An engaging portion 23 is disposed between every two adjacent separating panels 25.

Figure 3:
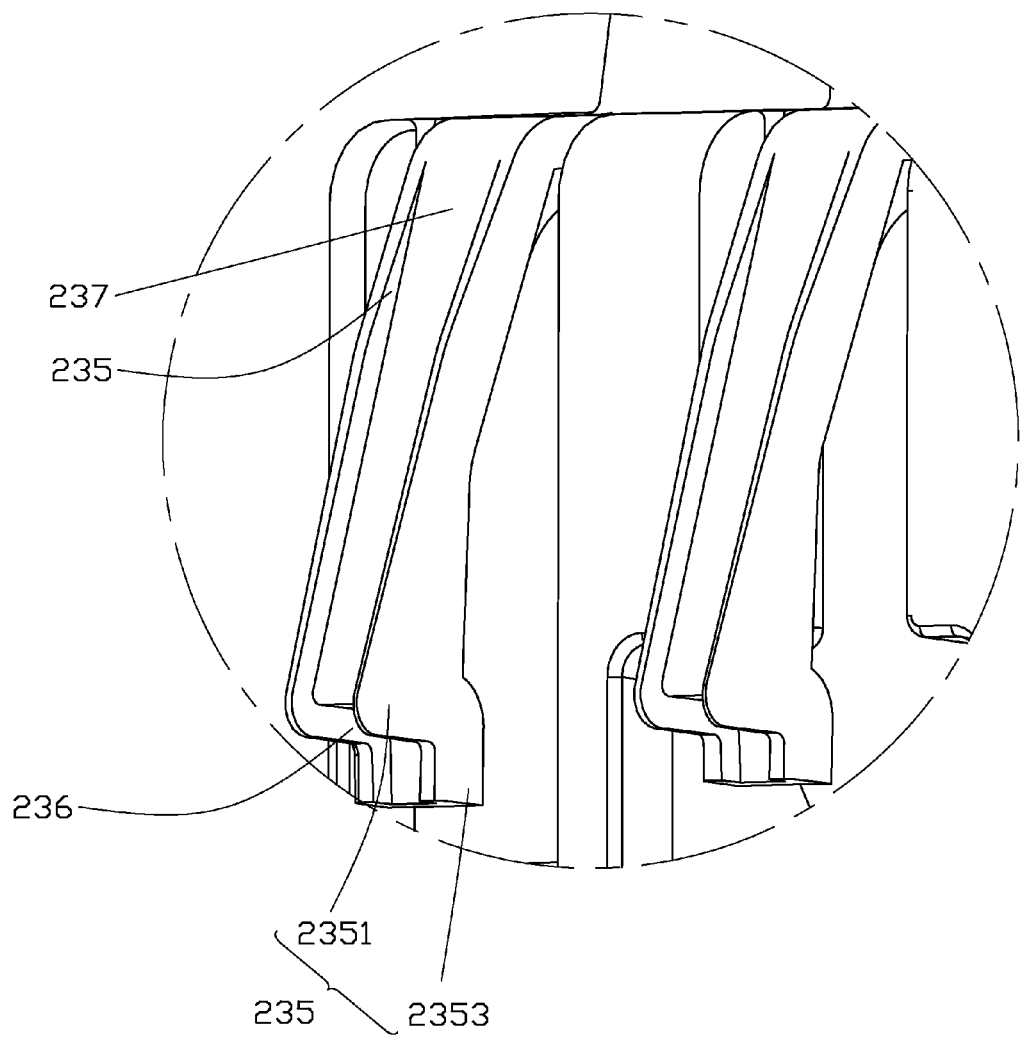
FIG. 3 is an enlarged view of circled portion III of FIG. 2.

Referring to FIG. 3, the engaging portion 23 includes two stopper boards 235. A positioning slot 236 is defined between the two stopper boards 235. In one embodiment, the positioning slot 236 and the retaining slot 1115 are arranged in a longitudinal line. Each stopper board 235 includes a diagonal portion 2351 and a vertical portion 2353, and the vertical portion 2353 has a length smaller than that of the diagonal portion 2351. A slant block 237 is received in the positioning slot 236 and is located between the two diagonal portions 2351 of the two stopper boards 235. The slant block 237 is elastic.

Figure 4:
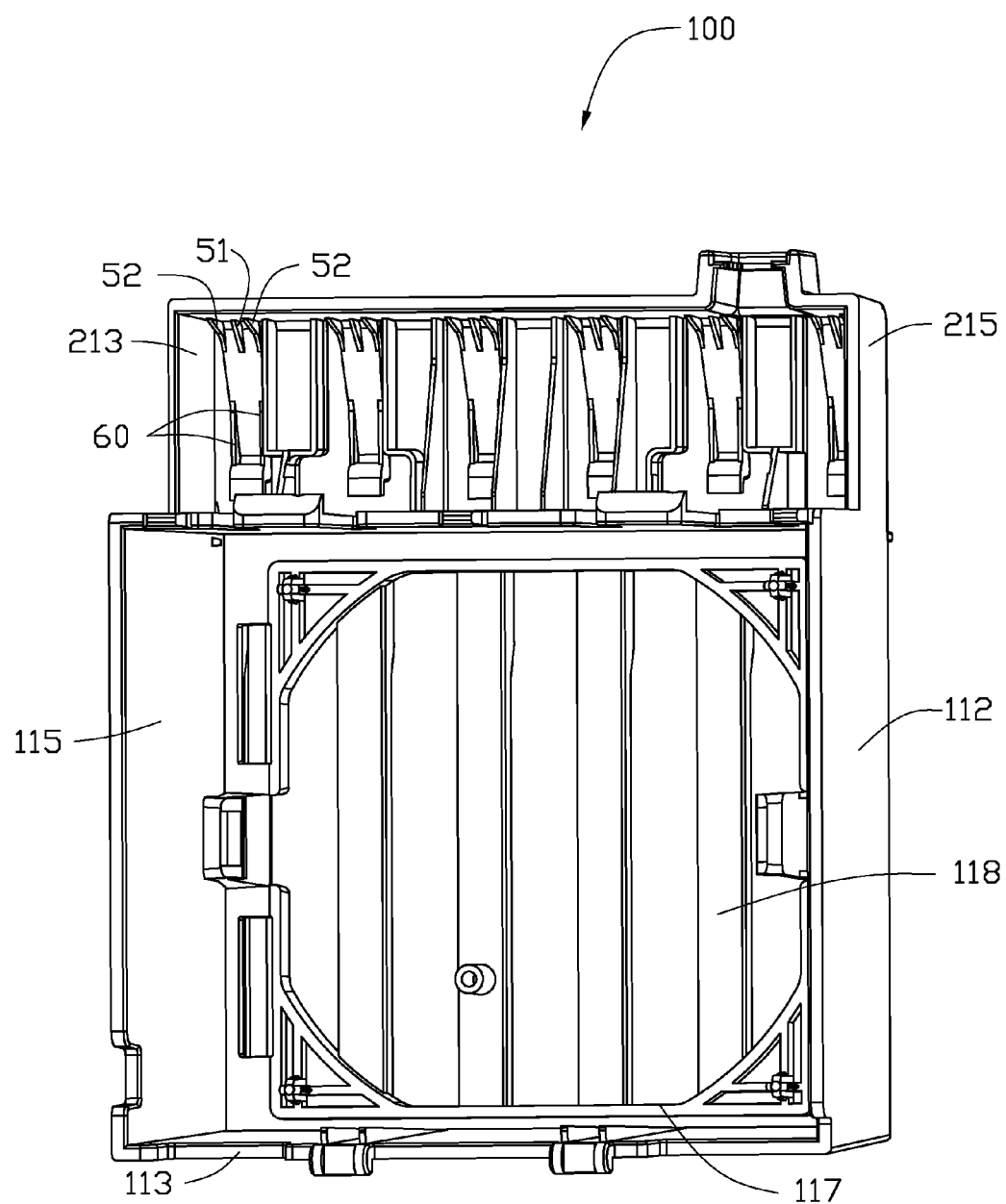
FIG. 4 is similar to FIG. 2, showing in a different aspect.

Referring to FIG. 4, two first strengthening ribs 52, a second strengthening rib 51 and two parallel third strengthening ribs 60 are disposed on the back of each slant block 237. The first strengthening ribs 52 and the second strengthening rib 51 are connected to the top wall 211. The first strengthening ribs 52, the second strengthening rib 51 and the third strengthening ribs 60 are used to strengthen the section of the slant block 237. In one embodiment, a free edge of each first strengthening rib 52 is arc-shaped, and the second and third strengthening ribs 51, 60 are triangular-shaped.

Figure 5:
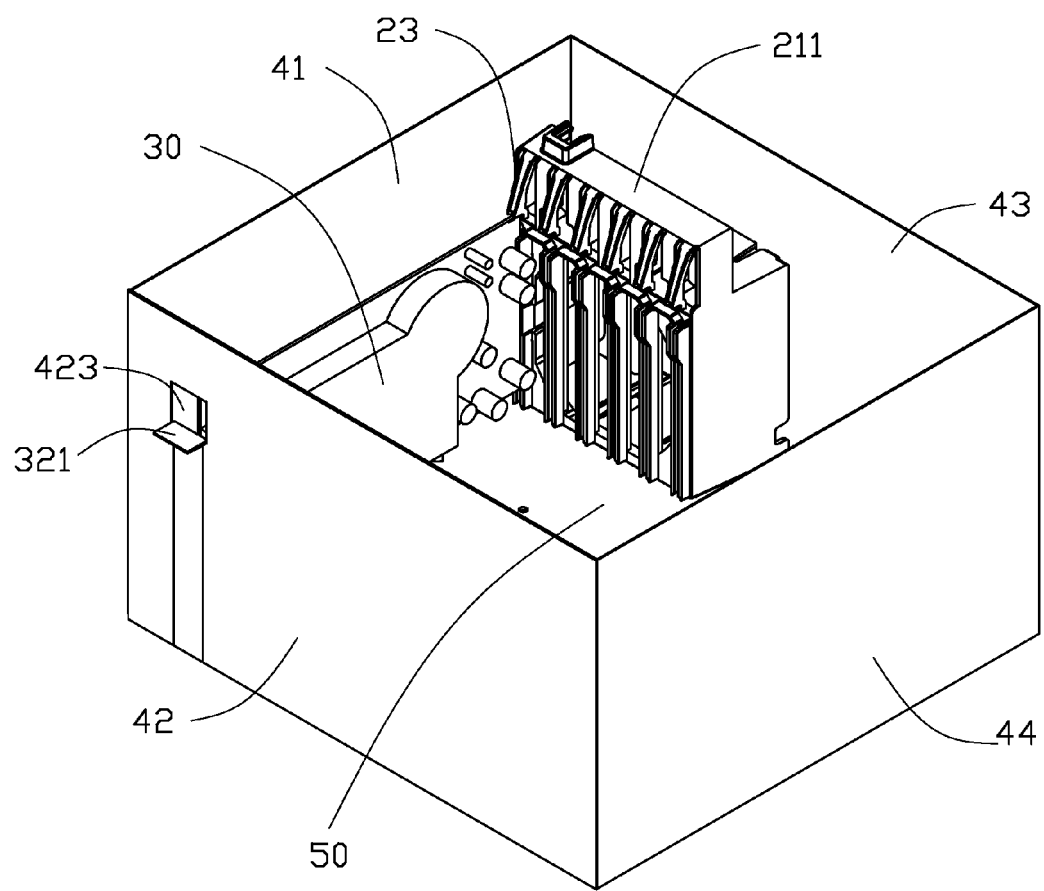
FIG. 5 is an assembled view of FIG. 1.

Referring to FIG. 5, in assembly, the three first clasping portions 1143 of the mounting tray 100 are engaged in the three first clipping holes 432 of the front plate 43. The two second clasping portions 1141 are engaged in the two second clipping holes 431 of the front plate 43. The two third clasping portions 1131 are engaged in the two third clipping holes 433 of the front plate 43.

The expansion card 30 is moved in a direction perpendicular to the motherboard 50, until the second short end 311 is stopped by the slant block 237. The expansion card 30 is further moved, to deform the slant block 237. When the second short end 311 passes through the slant block 237 and is received in the retaining slot 1115 of the first section 10, the expansion card 30 is further moved, until the inserting piece 313 is received in the extension slot 501 and the extending piece 323 is inserted into the gap 451. Then, the top long end of the expansion card 30 abuts to the bottom of the slant block 237. The flange 321 of the expansion member 32 abuts the edgefold 421. In one embodiment, the flange 321 is mounted to the edgefold 421 by screws.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
   a chassis comprising a front plate and a rear plate opposite to the front plate;
   an expansion member attached to a first end of an expansion card, the expansion member engaged with the rear plate; and
   a mounting tray comprising a first section engaged with the front plate and a second section connected to the first section, the second section comprising a sidewall; a retaining slot defined in the first section, an engaging portion disposed on the second section, the engaging portion comprising two parallel stopper boards that are substantially parallel to the sidewall; the two parallel stopper boards cooperatively defining a positioning slot; the positioning slot and the retaining slot located in a longitudinal line and configured for receiving a second end of the expansion card; a slant block located in the positioning slot and configured for preventing the expansion card from disengaging from the positioning slot.

2. The mounting apparatus of claim 1, wherein each stopper board comprises a diagonal portion and a vertical portion connected to the diagonal portion, and the vertical portion has a length smaller than that of the diagonal portion.

3. The mounting apparatus of claim 2, wherein a slant block is located adjacent to the diagonal portion, and the slant block is elastic.

4. The mounting apparatus of claim 3, wherein the first section comprises a top wall, the slant block is connected to the top wall, and a first strengthening rib is connected to the top wall and the slant block.

5. The mounting apparatus of claim 4, wherein an edge of the first strengthening rib is arc-shaped.

6. The mounting apparatus of claim 1, wherein an edgefold extends from the rear plate, a flange disposed on the expansion member, and the flange is attached to the edgefold.

7. The mounting apparatus of claim 1, wherein the second section comprises a base, a first retaining panel and a second retaining panel are located on the base, and the retaining slot is located between the first retaining panel and the second retaining panel.

8. The mounting apparatus of claim 7, wherein the first retaining panel and the second retaining panel are substantially parallel to each other and perpendicular to the base.

9. The mounting apparatus of claim 1, wherein the second section comprises a top panel and a bottom panel; a first clasping portion and a second clasping portion extend from the top panel, configured to engaged into a first clipping hole and a second clipping hole defined in the front plate; and a third clasping portion extends from the bottom panel, configured to engaged into a third clipping hole defined in the front plate.

10. A mounting apparatus comprising:
    a chassis comprising a front plate and a rear plate opposite to the front plate;
    an expansion member attached to a first end of an expansion card, the expansion member engaged with the rear plate; and
    a mounting tray comprising a first section and a second section connected to the first section, a retaining slot defined in the first section, a slant block protruding from the second section and located in a longitudinal line with the retaining slot; the second section comprising an engaging portion; the engaging portion comprises two stopper boards; and each stopper board comprises a diagonal potion and a vertical portion connected to the diagonal portion;
    wherein the first section is engaged with the front plate, and the retaining slot is configured for receiving a second opposite end of the expansion card.

11. The mounting apparatus of claim 10, wherein the two stopper boards are substantially parallel to each other; a positioning slot is located between the two stopper boards, and the slant block is received in the positioning slot.

12. The mounting apparatus of claim 10, wherein the vertical portion has a length smaller than that of the diagonal portion.

13. The mounting apparatus of claim 10, wherein the first section comprising a top wall, the slant block is connected to the top wall, and a first strengthening rib is connected to the top wall and the slant block.

14. The mounting apparatus of claim 13, wherein an edge of the first strengthening rib is arc-shaped.

15. The mounting apparatus of claim 10, wherein an edgefold extends from the rear plate, a flange disposed on the expansion member, and the flange is attached to the edgefold.

16. The mounting apparatus of claim 10, wherein the second section comprises a base, a first retaining panel and a second retaining panel are located on the base, and the retaining slot is located between the first retaining panel and the second retaining panel.

17. The mounting apparatus of claim 16, wherein the first retaining panel and the second retaining panel are substantially parallel to each other, and perpendicular to the base.

18. The mounting apparatus of claim 10, wherein the second section comprises a top panel and a bottom panel; a first clasping portion and a second clasping portion extend from the top panel, configured to engaged into a first clipping hole and a second clipping hole defined in the front plate; and a third clasping portion extends from the bottom panel, configured to engaged into a third clipping hole defined in the front plate.

* * * * *